(12) United States Patent
Larsen et al.

(10) Patent No.: US 8,290,634 B2
(45) Date of Patent: Oct. 16, 2012

(54) OPTIMIZING SYSTEM LOSS FOR A SYSTEM OF MULTIPLE WINDFARMS

(75) Inventors: Einar V. Larsen, Charlton, NY (US); Reigh A. Walling, Clifton Park, NY (US); Kara Clark, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/234,417

(22) Filed: Sep. 16, 2011

(65) Prior Publication Data
US 2012/0010756 A1      Jan. 12, 2012

Related U.S. Application Data

(62) Division of application No. 12/248,862, filed on Oct. 9, 2008, now Pat. No. 8,041,465.

(51) Int. Cl.
*H02P 9/04* (2006.01)
(52) U.S. Cl. .............................. 700/287; 290/44; 290/55
(58) Field of Classification Search .................. 700/287; 290/44, 55
See application file for complete search history.

(56) References Cited

U.S. PATENT DOCUMENTS

| | | | |
|---|---|---|---|
| 6,924,565 B2 * | 8/2005 | Wilkins et al. | 290/44 |
| 7,119,452 B2 | 10/2006 | Larsen | |
| 7,166,928 B2 | 1/2007 | Larsen | |
| 7,224,081 B2 | 5/2007 | Larsen | |
| 8,049,352 B2 * | 11/2011 | Jorgensen et al. | 290/44 |
| 2009/0218817 A1 * | 9/2009 | Cardinal et al. | 290/44 |
| 2010/0025994 A1 | 2/2010 | Cardinal et al. | |
| 2010/0274401 A1 | 10/2010 | Kjaer et al. | |

* cited by examiner

*Primary Examiner* — Ryan Jarrett
(74) *Attorney, Agent, or Firm* — Dority & Manning, P.A.

(57) ABSTRACT

A voltage control arrangement for a system of multiple windfarms with transmission lines. Voltage is regulated at a point of regulation on the system, such as a high voltage substation or other system bus. Regulation is achieved at the point of regulation by sensing the voltage, comparing to a reference voltage, and adjusting the reactive power output of the wind turbines and other equipment in the system. The regulation point may be shifted to another point if needed to respect voltage limits at that points of the system after attempting to shift reactive load to restore voltage within limits at the other points in the system. The reference voltage may be adjusted to minimize losses for the system of multiple windfarms and transmission lines. A loss optimizing algorithm is applied to the combined multiple windfarm and transmission line to shift reactive load among local windfarms to minimize losses and to shift reactive load among individual wind turbines within an individual windfarm.

7 Claims, 12 Drawing Sheets

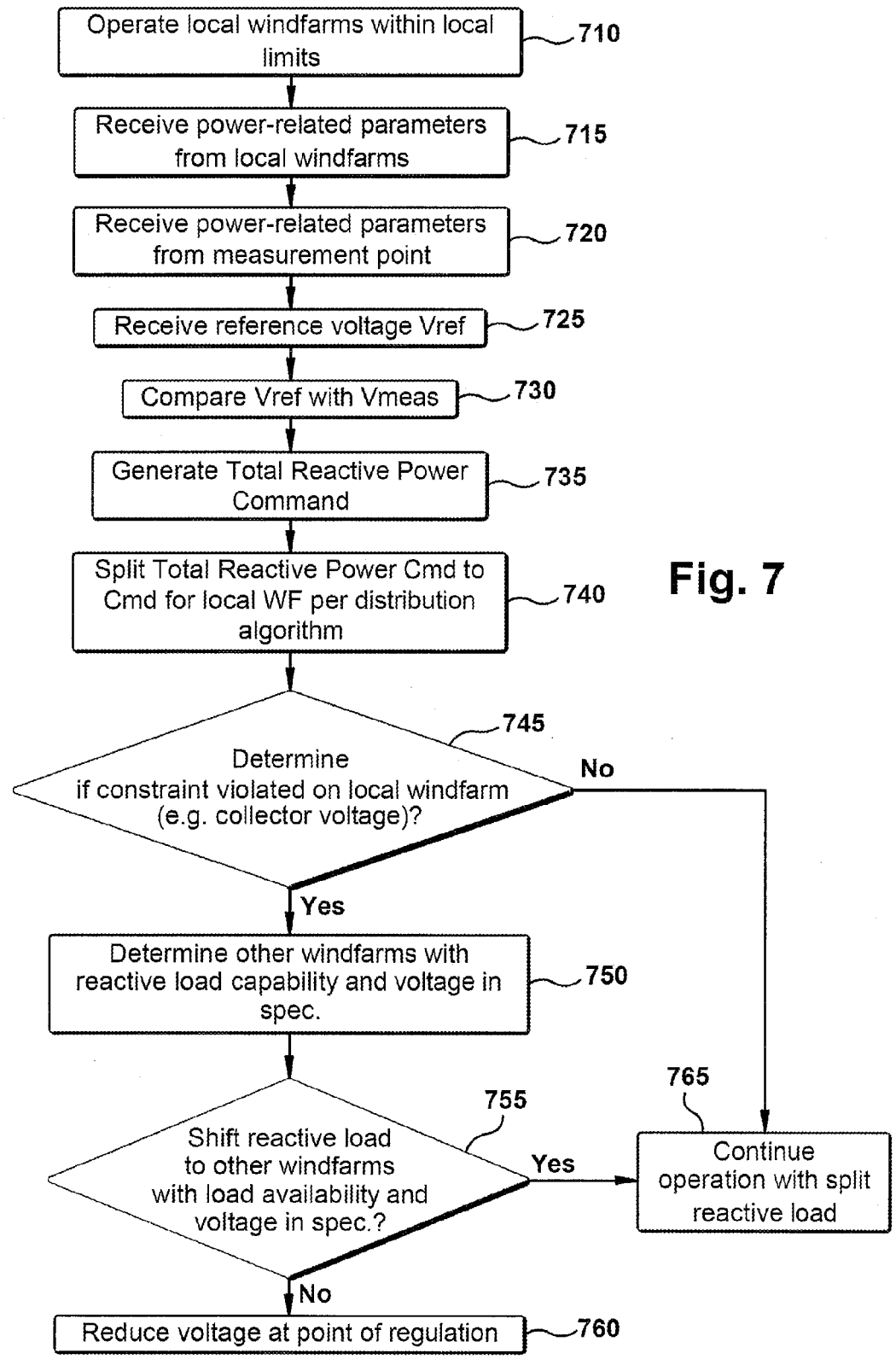

OPTIMIZING SYSTEM LOSS FOR A SYSTEM OF MULTIPLE WINDFARMS

RELATED APPLICATIONS

The present application is a divisional application of U.S. application Ser. No. 12/248,862, filed on Oct. 9, 2008, which is hereby incorporated by reference herein in its entirety for all purposes.

BACKGROUND OF THE INVENTION

The invention relates generally to operation of windfarms within an electric grid and more specifically to voltage control for a system of multiple windfarms.

Typically, an electric power system includes a plurality of power generation assets, which are spread over a geographic area. The electric power system also includes systems that consume power (loads) that may also be spread over the geographic area. The electric power system also includes a grid, a network of electric power lines and associated equipment used to transmit and distribute electricity over a geographic area. The infrastructure of the grid, may include, but is not limited to devices for interconnection, control, maintenance, and improvement of the electric power system operation. Typically, the electric power system includes a centralized control system operatively connected to the power generation assets for controlling a power output of each of the power generation assets, for example, using processing logic. The network operator usually operates the centralized control system. The power output of the power generation assets controlled by the centralized control system may include, but is not limited to an amount of electrical power, and a voltage for the electrical power.

Wind energy is often used to generate electrical power at power plants, often referred to as windfarms, using, for example, the rotation of large wind turbines to drive electrical generators. Windfarms and their associated windfarm controllers can control reactive power supply, and to a more limited extent active power. Larsen, in U.S. Pat. No. 7,119,452, No. 7,166,928, and No. 7,224,081 (assigned to General Electric Co.) describes a voltage control for wind generators including a farm-level controller with a reactive power command and a wind turbine generator control system. Wind turbine generator voltage control may be provided by regulating the voltage according to a reference set by a higher-than-generator-level (substation or farm level) controller. Reactive power may be regulated over a longer term (e.g. few seconds) while wind turbine generator terminal voltage is regulated over a shorter term (e.g. fraction of a second) to mitigate the effect of fast grid transients.

For economic reasons and as one of the approaches to reduce the environmental impacts of fossil fuel power generation, wind turbine generators with larger power output are being produced and windfarms with greater numbers of wind turbine generators are being brought into operation. The power output from the windfarms may comprise a significantly larger part of the total power being supplied and transmitted along the transmission grid. Often, an original windfarm may be sited at a certain geographic location, based on desirable wind conditions at that location. Later, one or more additional windfarms may be sited at the same geographic area, based on the desirable wind conditions that motivated the first windfarm. The later windfarms may be built by the same operator as the first windfarm or by completely different operators. The outputs from windfarms may be interconnected in a variety of points, which are ultimately tied together at a point of common coupling. The point of common coupling may also be the point of interconnection to the electric power system grid. The point of common coupling may provide a location for measurement of combined output parameters from the plurality of interconnected windfarms. Alternatively, the point of common coupling may be removed from the point of interconnection with grid. Increasingly, as windfarms are being located in geographic areas with valuable wind characteristics, the windfarms are remote from existing transmission lines of a grid. Increasingly, transmission lines of up to hundreds of miles need to be constructed to tie newly-built windfarms into the existing grid.

The interconnection of the windfarms in the windfarm system may be in different configurations. The distances between the windfarms may vary. Further, the point of physical connection with the grid may be remote from any of the individual windfarms and the point of common coupling. In the case of the plurality of interconnected windfarms with individual local windfarm controllers, individual local power-related commands may be provided to the individual local windfarm controllers from the central control system. Typically, the power-related commands provided to the local windfarm controller may direct the local windfarm controller to provide a specific power-related output at the point of common coupling. However, the plurality of individual local windfarm controllers cannot control at the point of common coupling because the power-related parameters at that point are a combination of the outputs from all of the individual windfarms.

Prior art windfarm systems have incorporated regulation of the voltage output from multiple windfarms at a location of measurement or a point of common coupling, For example, Cardinal et al. (U.S. application Ser. No. 12/181,658 assigned to General Electric Co.) describes a master reactive control device for regulating voltage output from multiple windfarms at a point of common coupling or a point of interconnection with a grid. In other instances, the regulation of voltage output for multiple windfarms at a point of regulation distant from the location at which the parameters may be measured, for example at the point of interconnection with the grid. However, voltage regulation at a single point associated with the output from the multiple windfarms may lead to violation of voltage limits at other locations on the transmission line or within individual windfarms. FIG. 1 illustrates a voltage profile at various points on a transmission line between a point of common coupling (POCC) with a windfarm and a point of interconnection (POI) with a grid. Planning criteria may typically require that rated power from the windfarm be delivered at the POI for voltages in the range of 0.95 power unit (PU) to 1.05 PU. However, depending upon the fraction of rated power and compensation schemes employed, voltage will vary along the transmission line between the POCC and the POI with the grid. It would be desirable to be able to control output of windfarms to maintain points on the transmission line within voltage specification during transmission line operation. Voltage or other limits could similarly be violated at other points in the system of windfarms, such as at collector bus outputs for individual windfarms.

Further, prior art has incorporated methods for distributing reactive load and windfarm voltage optimization for reduction of collector system losses within individual windfarms such as in Cardinal et al. (U.S. application Ser. No. 12/039,028 assigned to General Electric Co.). FIG. 2 illustrates a prior art system for minimizing losses within a single windfarm by distribution of reactive power commands to individual wind turbines utilizing a loss minimization algorithm.

The windfarm collector system 200 shows three wind turbine generators 201, 202, and 203, however, the number of wind turbine generators may be broadly extended in practical application. The wind turbine generators 201, 202 and 203 provide outputs $P_1+jQ_1$ (207), $P_2+jQ_2$ (208) and $P_3+jQ_3$ (209). Each wind turbine generator 201, 202 and 203 is tied to a collector bus 205 through a wind turbine generator connection transformer 210, 211 and 212, respectively, where the transformer presents an impedance Z1, Z2 and Z3 to the collector system. The wind turbine generator collection transformers 210, 211 and 212 may be located at varying physical distances 215, 216 and 217 from the collection bus 205 presenting different line resistance and reactance to the system (Z4, Z5 and Z6). A common path for one or more wind turbine generator loads may also be presented to the collector system such as 218 (Z7) between the collection bus 205 and wind farm main transformer 224. While the impedances are shown for illustrative purposes as discrete elements, it is recognized that they may represent distributed line elements, representing varying distances of line.

The collector bus 205 is tied through a point of common connection to a transmission grid 225 through wind farm transformer 224. Sensing devices at the POCC 220 may provide measured voltage, current, power factor, real power and reactive power signals to a windfarm control system. A control system is provided for the windfarm. A reference command is provided to the windfarm control system for control of real and reactive power. However, only the reactive load reference command signal $Q_{REF}$ 230 and reactive measured load signal $Q_M$ (measured) 235 are provided to summer 240. The output from summer 240 is provided to control functions H(s) 250 for determining relative load distribution to the individual wind turbine generators. Control functions H(s) 250 incorporates a loss minimization algorithm whose technical effect is to minimize windfarm collector system loss by assignment of reactive loads Q1 251, Q2 252 and Q3 253 based on losses resulting from Z1, Z2 and Z3 wind turbine generator connection transformer losses, from Z4, Z5 and Z6 line losses and Z7 line losses. Further the windfarm control algorithm may be subject to various constraints, one of which may be a power factor of approximately 0.95 at the POCC. Such methods, however, have not addressed loss optimization for multiple windfarms including a transmission line between the windfarms and a point of interconnection (POI) with a grid.

Accordingly, there is a need to provide voltage controls at a point of regulation for multiple windfarms, which also provides for constraints on voltage or other system parameters at other locations on the system of windfarms. Further there is a need optimize losses in more complex windfarm systems, including systems of multiple windfarms feeding transmission lines.

BRIEF DESCRIPTION OF THE INVENTION

The present invention relates to a system and method for voltage control of a system of multiple windfarms including transmission lines.

Briefly in accordance with one aspect of the present invention a system of windfarms is provided, adapted for controlling voltage at a reference point on the system of windfarms including a transmission line providing a connection to a grid for one or more coupled local windfarms wherein voltage control at the reference point is subject to constraints on maintaining designated system parameters within specified tolerance. The embodiment of the system may include a plurality of local windfarms. Each of the local windfarms may include one or more individual wind turbine generators WTG with an individual output transformer. A collector system for each local windfarm including a collector transformer joined through a network of conductors with the individual WTGs and their individual output transformers may be provided. One or more collector systems may be joined through a network of conductors at a collector substation. The collector system transformer steps up voltage to a level for suitable for the transmission line. One or more substations may be connected to one or more transmission lines further connecting the collector systems to a grid. The system may further include a local windfarm controller for each local windfarm, adapted for controlling generation of reactive power for each individual generator of a local windfarm to operate within the voltage and thermal limits of the individual wind turbine generator. The system may further include a voltage reference point on the system for voltage control and at least one constraint point on the system in addition to the voltage reference point, wherein an operating parameter for the system of windfarms is constrained by the control system. A master controller for the windfarm system control system is provided. The master controller is adapted for generating real power and reactive power command for each local wind farm controller for controlling voltage at the voltage reference point to a designated value subject to at least one additional constraint on an operating parameter for the system of windfarms at the constraint point.

According to a further aspect of the present invention, a method is provided for controlling voltage at a point of regulation on a system of windfarms, including a plurality of local windfarms with each windfarm with a plurality of individual wind turbine generators (WTG), a collector system for each local windfarm including a collector transformer and network of conductors joining individual WTGs at a point of common coupling, and at least one transmission line providing a connection to a grid for the plurality of local windfarms, wherein voltage control at the point of regulation is subject to constraints on maintaining designated system parameters within specified tolerance. The method includes generating, by a master controller for the system of windfarms, a reactive power command for a controller for each of the local wind farm, adapted to control voltage at the voltage regulation point to a designated value subject to at least one additional constraint on an operating parameter for the system of windfarms.

A further aspect of the present invention provides a method for optimizing losses in an overall system that involves multiple wind farms plus a transmission grid between the windfarms and a point of interconnection (POI).

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIG. 7 illustrates a flow chart of a method for voltage control of a multiple windfarm system including transmission line through reactive load distribution with constraints on additional system parameters;

DETAILED DESCRIPTION OF THE INVENTION

The following embodiments of the present invention have many advantages, including The present invention may regulate the output of a system of multiple coupled windfarms, connected to a grid of an electrical power system, so as to jointly regulate a single common point of electrical coupling through coordinated real power, reactive power and voltage response. A windfarm system control device may monitor a common measurement point for power-related parameters (such as currents, voltage, real power, reactive power and power factor) where the parameter value at the measurement point is an aggregate sum of the contributions for each local windfarm. Line drop compensation may be applied, if necessary, to compensate for real power losses, reactive power losses, and voltage drops that may be required if the measurement point is not at the point in the system at which the combined output of the windfarms is to be regulated. The windfarm system control device may incorporate a reactive power output command that can be used to regulate voltage at the point of common coupling. Reactive power commands to each local windfarm may be controlled such that operating parameters on other points of the system are not violated. For example, while regulating voltage at one designated point on the system of windfarms, such as a point of common connection, constraints are observed for at least one other point on the system, such as a point on the transmission line or a collector bus for a windfarm system. A method for implementing the coordinated control is provided.

Figure 1:
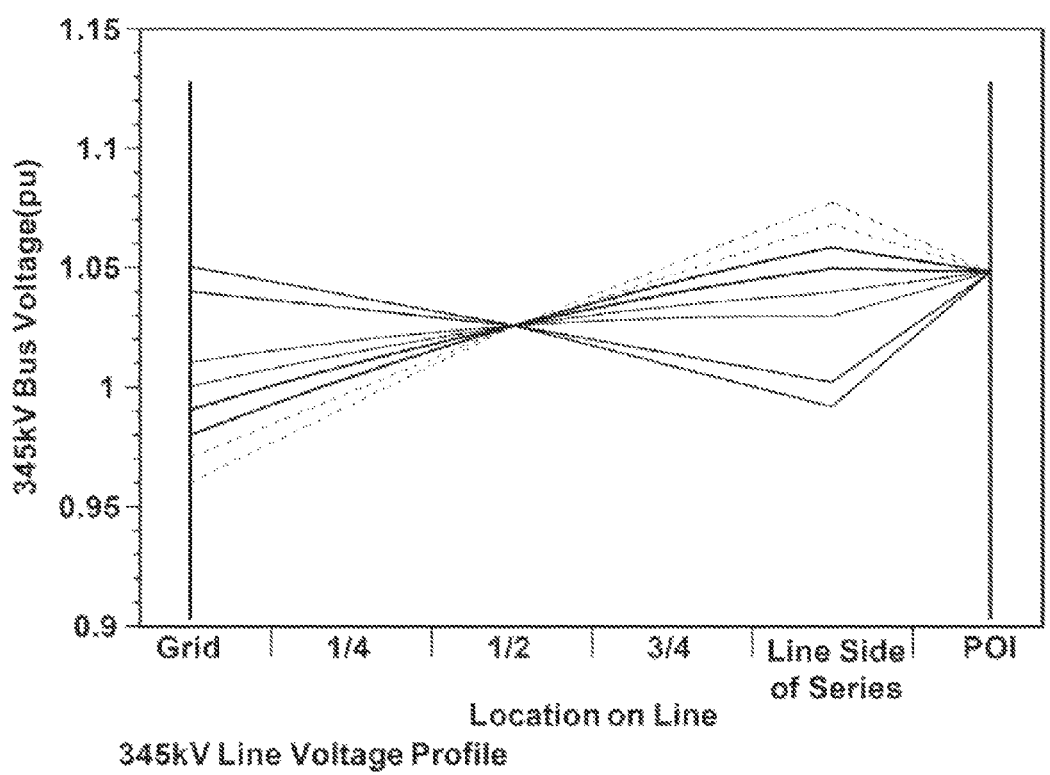
FIG. 1 illustrates a voltage profile at various point on a 345 kv transmission line between a point of common coupling (POCC) with a windfarm and a point of interconnection (POI) with a grid.
Figure 2:
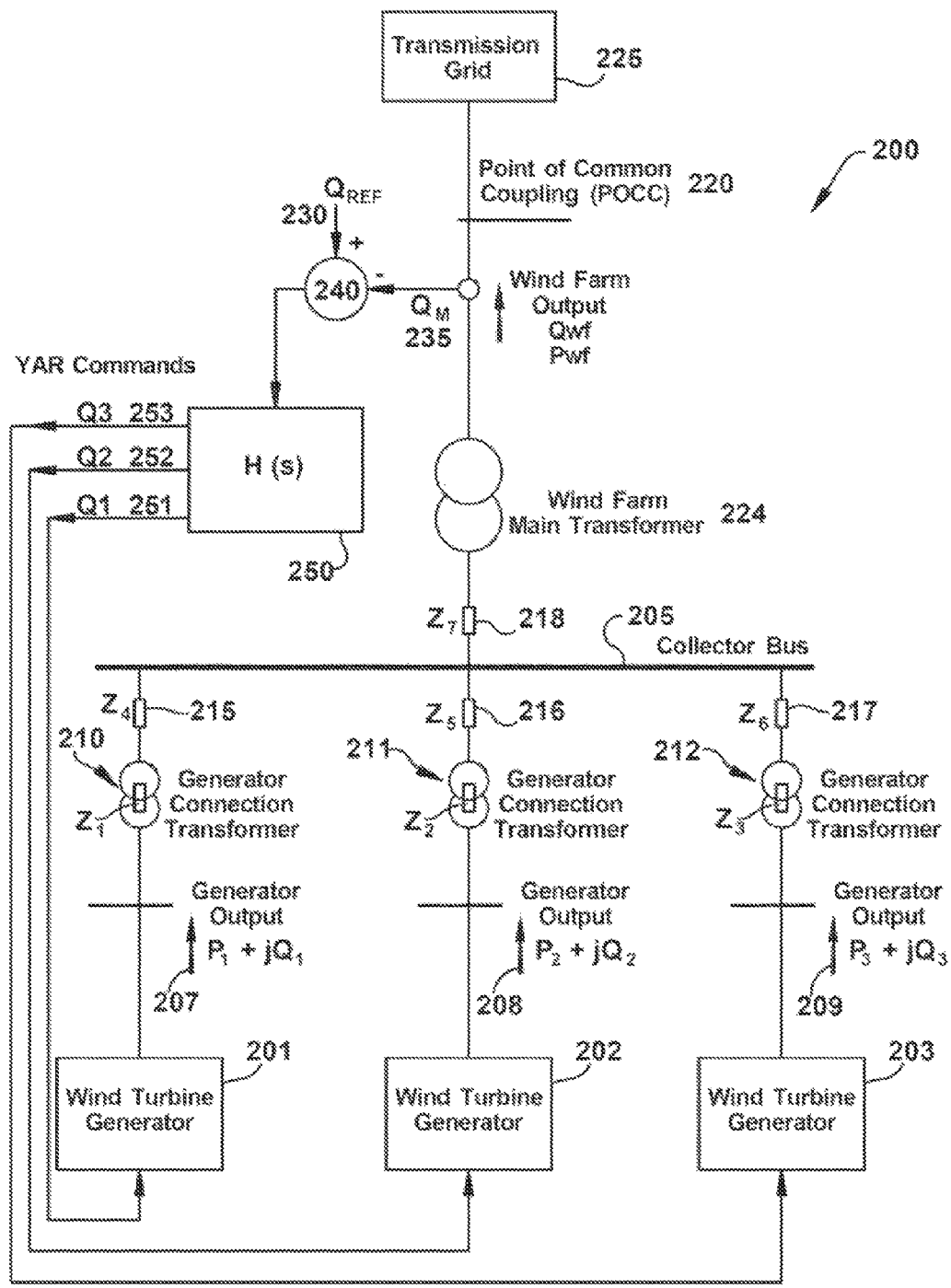
FIG. 2 illustrates a prior art system for minimizing losses within a single windfarm by distribution of reactive power commands to individual windturbines.
Figure 3:
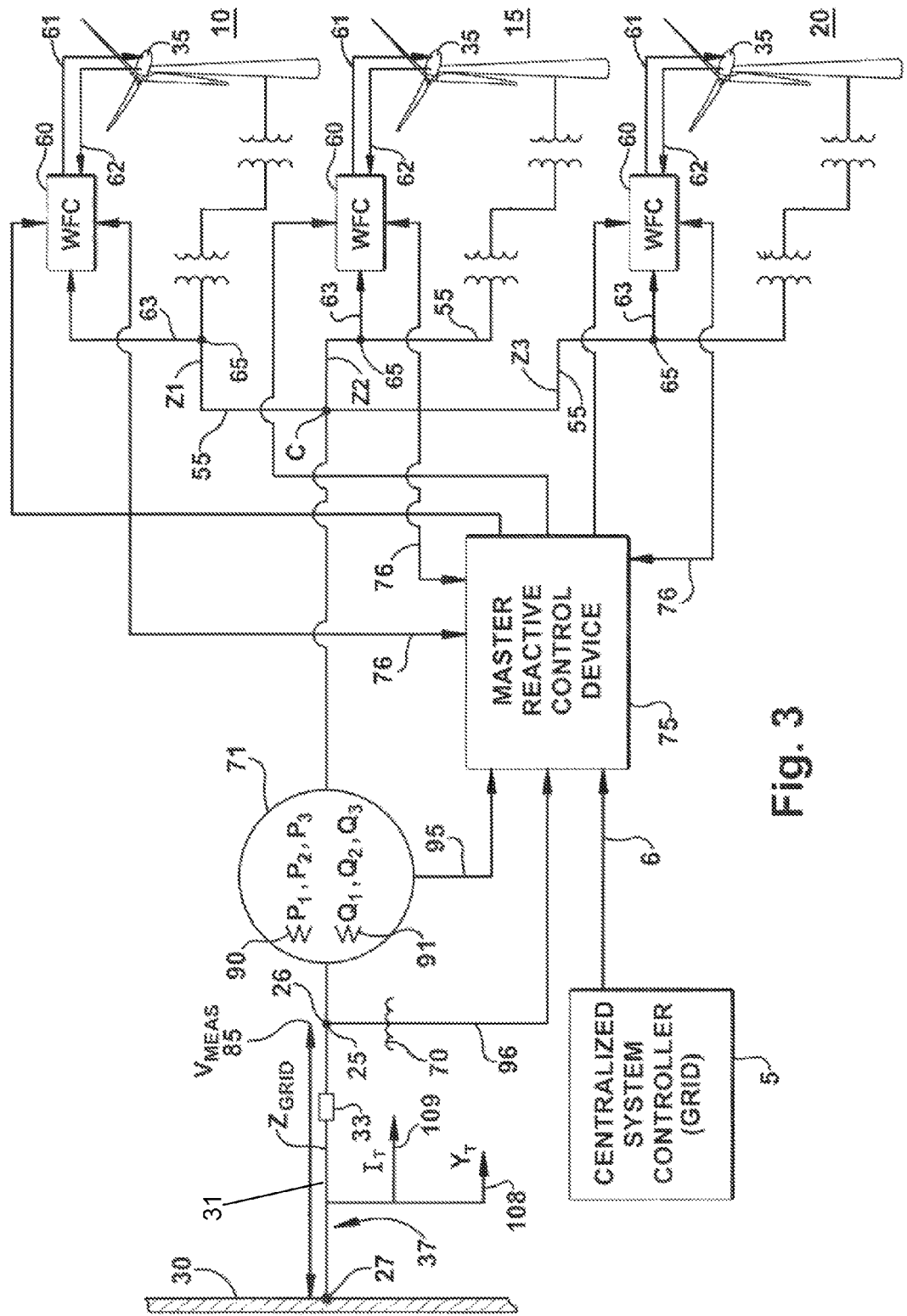
FIG. 3 schematically illustrates a windfarm system control scheme adapted to measuring power-related system parameters at a point of common coupling for a plurality of tightly-coupled local windfarms and using the measured parameters to control local windfarm controllers for establishing power-related parameters at the point of common coupling.

FIG. 3 schematically illustrates a windfarm system control device adapted to measuring power-related system parameters at a point of common coupling for a plurality of tightly-coupled local windfarms and using the measured parameters to control local windfarm controllers for establishing power-related parameters at the point of common coupling. A first local windfarm 10, a second local windfarm 15, a third local windfarm 20, may represent a plurality of any number of local windfarms connected at their outputs to a point of common coupling 25 through transmission lines, presenting impedances Z1, Z2 and Z3 respectively. The local windfarms 10, 15, 20 each are shown within one wind turbine generator 35, but local windfarms may include a hundred or more wind turbine generators. Each local windfarm 10, 15, 20 includes a local windfarm controller 60. The local windfarm controller 60 may monitor power-related parameters 63 at the output from the individual local windfarm 65, monitor the operating status 62 of individual wind turbine generators and provide control signals 61 to the individual wind turbine generators 35 within the respective local windfarm 10, 15, 20. One or more transmission lines 31, may connect the POCC 25 with the POI 27 with grid 30. The transmission lines 31 may include one or more reactive control devices 22 capable of adjusting reactive load on the line.

The system of windfarms may also include at least one substation, wherein an output from at least one of the individual windfarms is connected to the substation and an output from at least one different individual windfarm is connected to a different substation. The outputs from one or more of the substations may feed one or more transmission lines.

The grid 30 may typically present an impedance at the point of common coupling to the interconnected windfarms of $Z_{GRID}$, where $Z_{GRID}$ is large in comparison to the impedances Z1, Z2 and Z3 presented by the local windfarms. Consequently, due to the tight coupling of the local windfarms, any individual local windfarm controller trying to respond to a signal from a centralized system controller to provide an output at the point of common coupling 25 would be competing with the other local windfarm controllers and their control signals to implement an output at the point of common coupling.

A plurality of sensing devices 70, 71 at the point of common coupling 25 may sense a plurality of power-related parameters 85, 90, 91 at a point of common coupling 25 (in this case also at the point of measurement 26). The power-related parameters may include real power, reactive power, voltage, line current, and power factor. The power-related parameters may be transmitted 95, 96 to the windfarm system control device 75 by various means known in the art. The windfarm system control device 75 may use the above-described power-related parameter values, along with other local windfarm power-related parameter signals 76 for controlling the output of the local windfarms 10, 15, 20 based on reference command signals 6 from the centralized system controller 5.

The windfarm system control device 75 may use the power-related parameters to coordinate the individual local windfarms production of vars to regulate system quantities at the point of common connection 25. The plurality of windfarms may be controlled such that each individual wind farm 10, 15, 20 maintains its own voltage, power and VAR limits in addition to minimizing and eliminating var and voltage oscillations between these closely coupled windfarms. Further, if a point of regulation by the centralized system controller 5 of the electric power system for the interconnected local windfarms is chosen to be at a location other than the point of measurement 26 for the local windfarms, the windfarm system control device 75 for the local windfarms 10, 15, 20, 21 may provide compensation for voltage drop and power loss between the point of regulation and the point of measurement 26, utilizing the measured power-related parameters and other line parameters.

Figure 4:
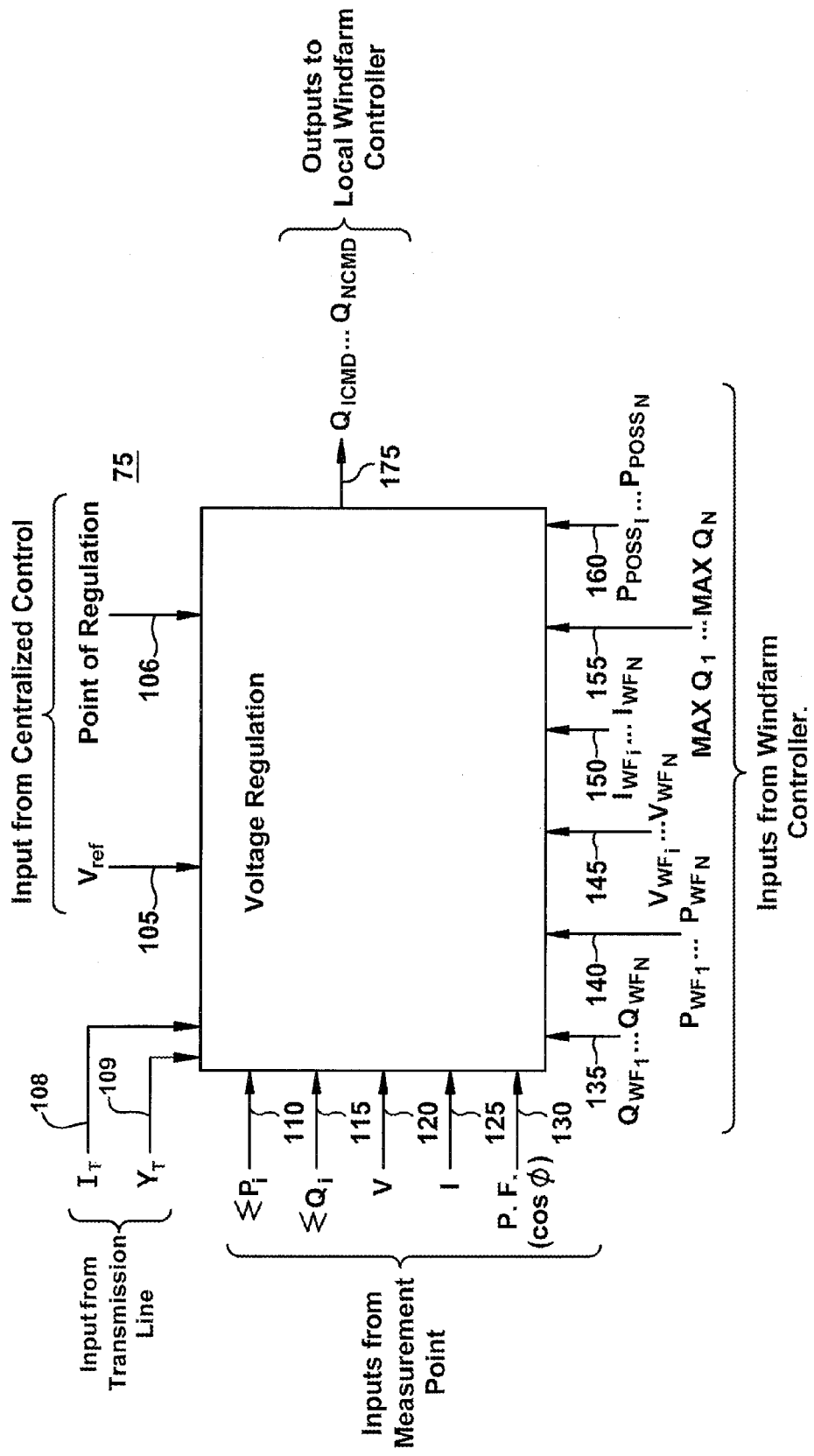
FIG. 4 illustrates input and output parameters that may be employed by the windfarm system control device (WCD) for controlling local windfarm operation.

FIG. 4 illustrates input and output parameters that may be employed by the windfarm system control device (WCD) for controlling local windfarm operation. The WCD 75 may receive a plurality of control inputs from the centralized system controller 5. The inputs may include, but are not restricted to, reference values for voltage ($V_{ref}$) 105 for a point of regulation and specifying point of regulation 106.

Total real power 110, total reactive power 115, line voltage 120, line current 125 and power factor 130 may be measured at the point of common coupling. Further measured parameters may be provided from the individual windfarms, including real power ($Pwf_1 \ldots Pwf_n$) 135, reactive power ($Qwf_1 \ldots Qwf_n$) 140, output voltage ($Vwf_1 \ldots Vwf_n$) 145, output current ($Iwf_1 \ldots Iwf_n$) 150. Further calculated parameters such as maximum reactive power ($MAXQwf_1 \ldots MAXQwf_n$) 155 and possible maximum real power $POSPwf_1 \ldots POSPwf_n$ 160 may be provided to the windfarm WCD from the individual local windfarm controllers. Here, the maximum reactive power 155 for an individual local windfarm may represent the summation of the maximum reactive power capability of individual wind turbine generators and the number of operating wind turbine generators within the local windfarm.

Further, parameters from the transmission line such as line voltage (Vt) 108 and line current (It) 109 may be measured at instrumented points on the transmission line or may be calculated from measured quantities at points in the system such as the point of interconnection or point of regulation.

Outputs from the windfarm system control device 75 may reactive power commands ($Q_{1CMD} \ldots Q_{nCMD}$) 175 to individual local windfarm controllers. The commands are established according to algorithms, whose technical effect is to provide voltage regulation at the point of common coupling.

Figure 5:
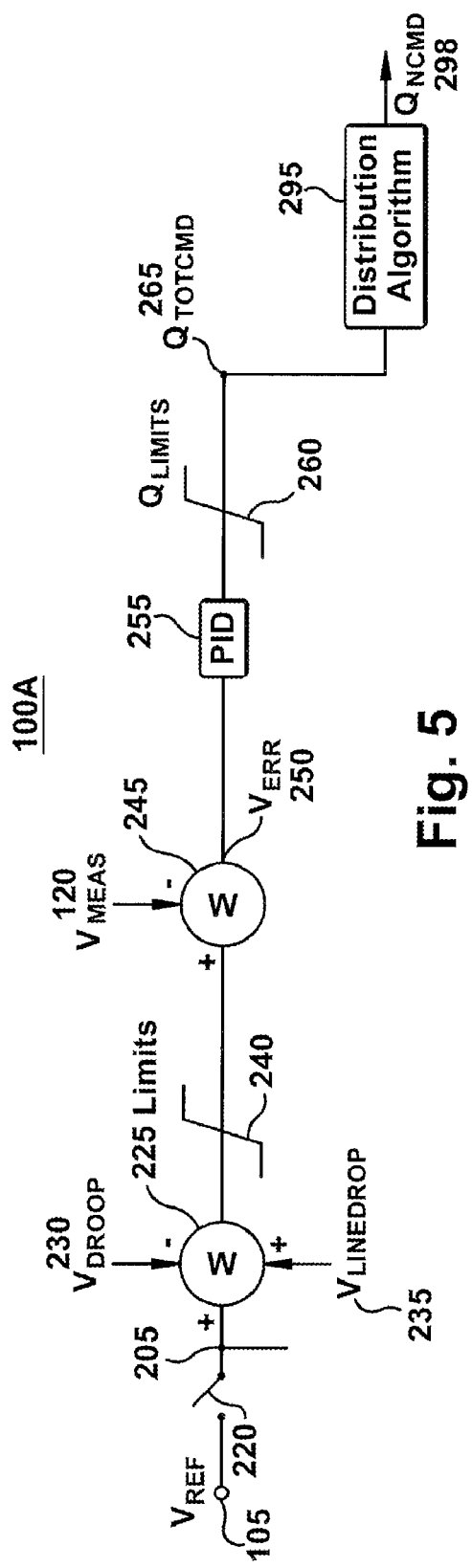
FIG. 5 illustrates one embodiment of a voltage regulator for the windfarm system control device.

FIG. 5 illustrates one embodiment of a voltage regulator for the windfarm system control device 75 according to the present invention. A voltage reference $V_{REF}$ 105 is provided to a voltage regulator 100A and a windfarm reactive power command 298 is provided at the output. In one aspect, the wind turbine control system is adapted for regulating voltage at a point of common coupling 25 at output of a plurality of tightly-coupled local windfarms 10, 15, 20 (FIG. 3). The input voltage reference 205 may be compared at summer 225 with a voltage droop signal 230 and with a line drop compensation signal $V_{linedrop}$ 235.

The combined signal is tested by limiter 240 to maintain voltage at the local connection point within limits. The combined signal then is compared in summer 245 against $V_{meas}$ 120 to generate voltage error signal $V_{err}$ 250 to be applied to proportional-integral-derivative (PID) controller 255 to generate a total reactive power command $Q_{TOTCMD}$ 265. $Q_{TOTCMD}$ 265 is bounded by Q limiter 260 where $Q_{LIMITS} = \Sigma Q_{LIM1} \ldots Q_{LIMn}$ for the individual windfarms. $Q_{TOTCMD}$ 265 represents the total reactive power being commanded for the plurality of windfarms. Sending reactive power commands to the local windfarms eliminates conflicts between the local windfarm voltage regulators. The total reactive power command $Q_{TOTCMD}$ 265 may then be apportioned as $Q_{nCMD}$ to the individual local windfarms according to a distribution function, to be further described.

The reference signal Vref 105 for a nominal system voltage may be designated by a centralized system operator. Alternatively the reference signal Vref 105 for the nominal system voltage may be specified by an operator for the system of windfarms. A control signal 108 (FIG. 3) from the centralized system operator or from the operator for the system of windfarms may also specify points on the system of windfarms including the transmission lines, which may be designated as the point of voltage regulation. The point of voltage regulation may be at the point of common coupling 25, a point of interconnection 27 with the grid 30 or at other designated points on the system. The point of measurement 26 for relevant system parameters may be at the point of common coupling 25. If the point of measurement for relevant system parameters is not the point of regulation, then the voltage drop between the point of regulation and the point of measurement may be calculated, taking into account line losses in voltage and power.

Figure 6:
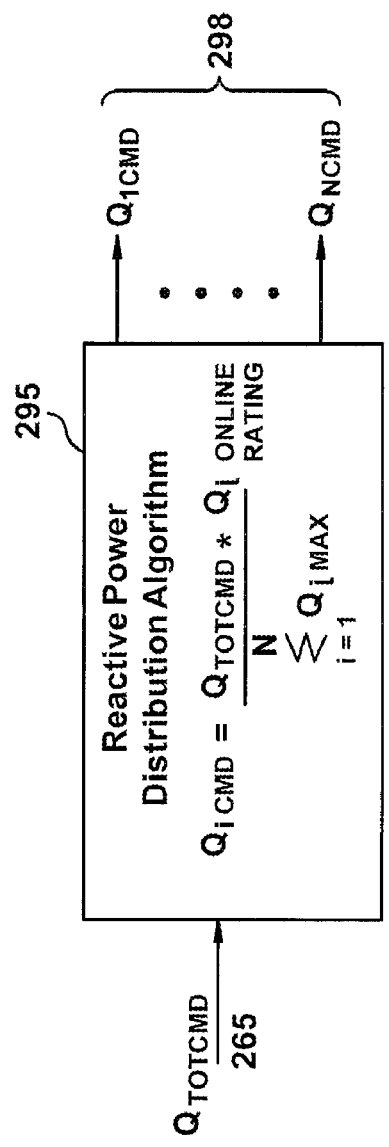
FIG. 6 illustrates a distribution function whereby total reactive power command developed by the voltage regulator may be assigned to the individual local windfarms.

FIG. 6 illustrates a distribution function whereby the $Q_{TOTCMD}$ developed by the voltage regulator for the total reactive power at the point of common coupling may be assigned to the individual local windfarms. From $Q_{TOTCMD}$ 265, a windfarm reactive power command $Q_{1CMD} \ldots Q_{nCMD}$ 298 may be assigned by a distribution algorithm 295 for each local windfarm controller. One embodiment of the distribution algorithm 295, may utilize local maximum online reactive power ratings provided from the individual local windfarm or the individual local windfarm controllers to the windfarm system control device 75. The local windfarm or local windfarm controller may generate its local maximum online reactive power rating $Q_{1ONLINE-RATING} \ldots Q_{iONLINE-RATING}$ 155 (FIG. 6), based on the number of wind turbine generators operating in the local windfarm and the reactive power rating of the individual wind turbine generators. The reactive power command provided to windfarm i, may be described in Equation 1:

$$Q_{iCMD} = \frac{Q_{TOTCMD} * Q_{iONLINERATING}}{\sum_{n=1}^{N} Q_{iMAX}}. \quad \text{Equation 1}$$

Additional constraints may be placed on the system such that the reference voltage may be maintained at the point of regulation subject to the maintenance of conditions at other locations on the system of windfarms. For example, the reference voltage at the point of regulation may be maintained subject to maintaining voltage along the transmission line within normal range of 0.95 PU to 1.05 PU. Or for example, the voltage along a section of the transmission line, built to withstand a voltage of 1.10 PU may be allowed to operate within an expanded voltage band of 0.95 PU to 1.10 PU. Information related to the voltage on the transmission line may be obtained from direct measurement on the transmission line or calculated according to voltage drop between points of measurement and the point of control. Such calculations may be performed by real-time system models.

Other constraints may be incorporated on collector buses, for example. Limits on collector bus output voltage may be required to be maintained within predesignated limits. Voltage limits may be required to be maintained within 0.95 PU to 1.05 PU.

If voltage at a point of constraint reaches a limit, then action may be taken to return voltage at the point of constraint to within the allowable limits. For example, if a collector bus exceeds a predesignated voltage limit, then reactive load may be shifted to another collector bus operating within acceptable voltage limits and with capability to accept additional reactive load. If no further reactive load can be shifted to restore collector bus voltage, then voltage at the point of regulation may be regulated to restore the collector bus to within the predesignated voltage limits.

Similarly, if voltage on one or more transmission lines exceeds allowable limits, then action should be taken to restore voltage to within limits. For multiple transmission lines such action may include operating reactive control devices on the transmission line whose effect is to shift load.

According to a further aspect of the present invention, a method is provided for coordinating control of closely-coupled local windfarms connected at a point of common connection with an electric power grid. The method may include receiving power-related reference signals (P, Q, V, I) from a centralized system controller for the electric power grid and also receiving power-related operational signals from each of a plurality of local windfarms. The method may also include sensing a plurality of power-related parameters at a point of common connection with grid. According to the reference signals provided from the centralized system controller and the power-related operational signals supplied by the plurality of local windfarms, a plurality of power-related commands are generated for each of the plurality of local windfarms. The plurality of power-related commands are transmitted to each of the plurality of local windfarms for controlling the output of the individual local windfarms to produce a combined output at the point of common coupling, or alternatively at a different point of regulation, according to the power-related reference signals.

FIG. 7 illustrates a flow chart of a method for voltage control of a multiple windfarm system including transmission line through reactive load distribution with constraints on additional system parameters. In step 710, local windfarms are operated within local limits according to the local windfarm controller. In step 715, the master control device (MCD) receives power-related parameters from local windfarm controllers. In step 720, the MCD receives power-related parameters from a system measurement point. Reference voltage Vref is received from a centralized system control or from a local control in step 725. Vref is compared with Vmeas in step 730. In step 735 a total reactive power command is generated. In step 740, the FIG. 8B illustrates a method for shifting of a regulating point from an original bus to a different bus when a parameter for the different bus is limiting total reactive power command is split to commands for the individual windfarms per a distribution algorithm. In step 745, it is determined whether a constraint is violated at a designated point on the system (for example a collector voltage). If no constraint is violated, operation may continue with the reactive load split to windfarms as determined by the distribution algorithm. If a constraint, such as collector voltage, is violated then it must be determined in step 750 whether other windfarms include additional reactive load capability and are also within voltage limits. In step 755, if reactive load can be shifted to another windfarm while maintaining voltage in specification, then operation with the new reactive load split is continued in step 765. If no shift of reactive load can be accomplished, then the reference voltage for the point of regulation may be reduced in step 760 to effect voltage regulation on the collector bus.

FIG. 8B illustrates a method for shifting of a regulating point from an original bus to a different bus when a parameter for the different bus is limiting. V0Ref 847 is the command to the POCC regulator 845 and V0Refo 865 is the desired value of V0Ref 847 from other inputs, e.g. loss optimization. Should this be within the limit V0Limit 885, then it is used directly; otherwise V0Ref 847 is held to V0Limit 885.

Figure 8A:
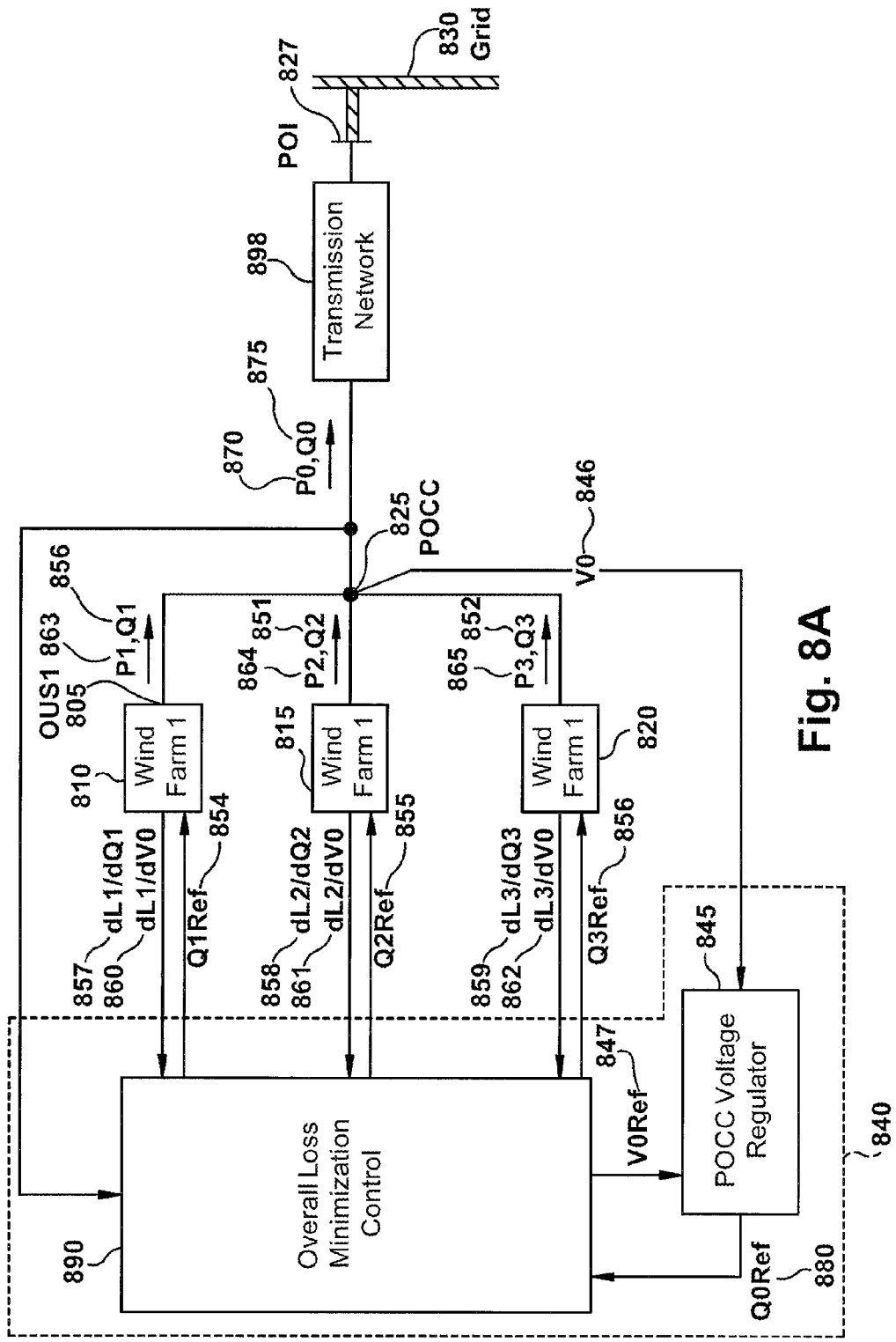
FIG. 8A illustrates a control scheme for optimizing system losses for a system of multiple windfarms including at least one transmission line.
Figure 8B:
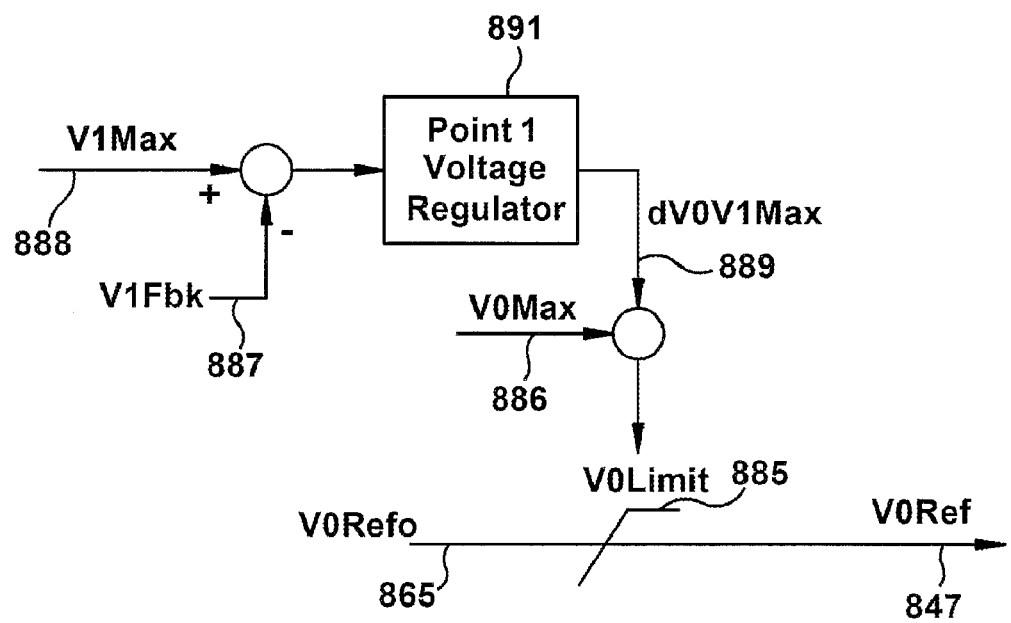
FIG. 8B illustrates a method for shifting of a regulating point from an original bus to a different bus when a parameter for the different bus is limiting.

V0Limit 885 is computed based on the equipment constraints at the POCC, indicated by the parameter V0Max 886, and the status of voltage at bus 1 805 (bus with constraint on its voltage such as collector bus 1 of windfarm 1 in FIG. 8A). V1Fbk 887 represents the measured feedback value of the voltage at bus 1 805 and V1Max 888 is a parameter set to the equipment constraint at that bus. The Point 1 voltage regulator 891 is an integrating type of regulator where the upper limit is zero. Normally, V1Fbk 887 is smaller than V1Max 888 so the output of the regulator, dV0V1Max 889, is zero due to this upper limit. Should V1Fbk 887 exceed V1Max 888, its output will become negative and V0Limit 885 will be decreased below the equipment capability of the POCC 825 (FIG. 8A). In steady-state, dV0V1Max 889 will settle at a value where the point 1 voltage is at its maximum value. When grid conditions change in a direction to relieve this constraint, then dV0V1Max 889 will become less negative and eventually equal zero. At that point the regulated bus will shift back to the POCC.

With multiple points of possible constraint, there would be multiple copies of these point regulators, each summing with V0Max to define V0Limit. The most constraining point will have regulation in this manner.

A further aspect of the present invention provides a method for optimizing losses in an overall system that involves multiple wind farms plus a transmission grid between the windfarms and a point of interconnection (POI). In this context, the POI is remote from the point of common coupling (POCC) of the individual local windfarms and losses in the transmission network between the POCC and POI are considered in the evaluation of minimizing system losses.

FIG. 8 illustrates a control scheme for optimizing system losses for a system of multiple windfarms including at least one transmission line. Each windfarm 810, 815, 820 connects into the grid at the POCC 825, where voltage is regulated by an overall system controller 840. The present example includes 3 windfarms; however, the method is applicable to any number of windfarms.

The setpoint for the voltage must be selected to minimize overall losses in the total network from the wind turbine generators (WTG) through the transmission line to the POI 827. An additional objective is to distribute the reactive commands among the windfarms such that the total losses of all of the windfarms 810, 815, 820 are minimized.

The POCC regulator 845 is a standard structure, where a reactive command to the grid (Q0Ref) 880 is determined in a manner that causes the measured voltage V0 846 at the POCC 825 to equal a reference voltage V0Ref 847. The POCC regulator 845 would typically be an integrating type of regulator with a closed-loop response time on the order of several seconds.

The function of the loss optimization function is to determine both the setpoint for V0Ref voltage 847 and to distribute the reactive commands among the windfarms 810, 815, 820 in a manner that minimizes losses from the WTGs to the POI.

Each windfarm 810, 815, 820 has a loss-optimization function as described in the prior art. This distributes reactive commands to each turbine within the local windfarm such that the total reactive output at the windfarm terminals equals the command (e.g. Q1 850=Q1Ref 854, Q2 851=Q2Ref 855, Q3 852=Q3Ref 856) and does so with minimum losses within that local windfarm.

A further requirement of the windfarm control is to calculate the partial derivative $(dLi/dQi)$ 857, 858, 859 of losses (L1, L2 and L3 within that local windfarm) to the reactive command (Q1, Q2, Q3) and to calculate the partial derivative $(dLi/dVi)$ 860, 861, 862 of losses to the POCC voltage V0

846. This is a straightforward extension of the relationships used to perform the optimization calculations within the local windfarm, relying on the same network data and equations. These partial derivatives are sent to the overall loss minimizing control.

The losses in the transmission network are calculated based upon the prevailing power flow (P0 870, Q0 875) and voltage (V0) 846 measured at the POCC 825, and known electrical characteristics of the transmission network 898 and the receiving network beyond the POI 827. Given this information, calculation is made for the partial derivative of transmission network losses with respect to voltage V0 (dL0/dV0) at the prevailing operating point. Similarly, the derivative of voltage with respect to reactive command can be determined from the network (dV0/dQ0).

For a given total reactive output, the total loss of the windfarms is minimized when the reactive distribution is such that the partial derivatives with respect to reactive output are equal. For the three-windfarm example, this is expressed by Equation 2:

$$dL1/dQ1 = dL2/dQ2 = dL3/dQ3 \quad \text{Equation 2.}$$

This fact is appreciated by considering a case where reactive command is increased on one windfarm. To maintain the total reactive command constant, the sum of the reactive commands to the other two windfarms must be decreased by an equal amount. If Equation 2 is satisfied, then there is no change in total losses by this shifting of reactive command. If Equation 2 is not satisfied, then there will be a change in total losses and the shifting should continue in a direction that reduces total windfarm losses.

Thus the objective for windfarm distribution is to assign reactive commands to the individual wind farms to meet the following criteria: 1. the sum of reactive commands equals the total reactive command; 2. equation 2 is satisfied in steady-state; and 3. a rapid response is provided to reactive command Q0Ref, to enable good performance of the POCC voltage regulator.

Figure 9:
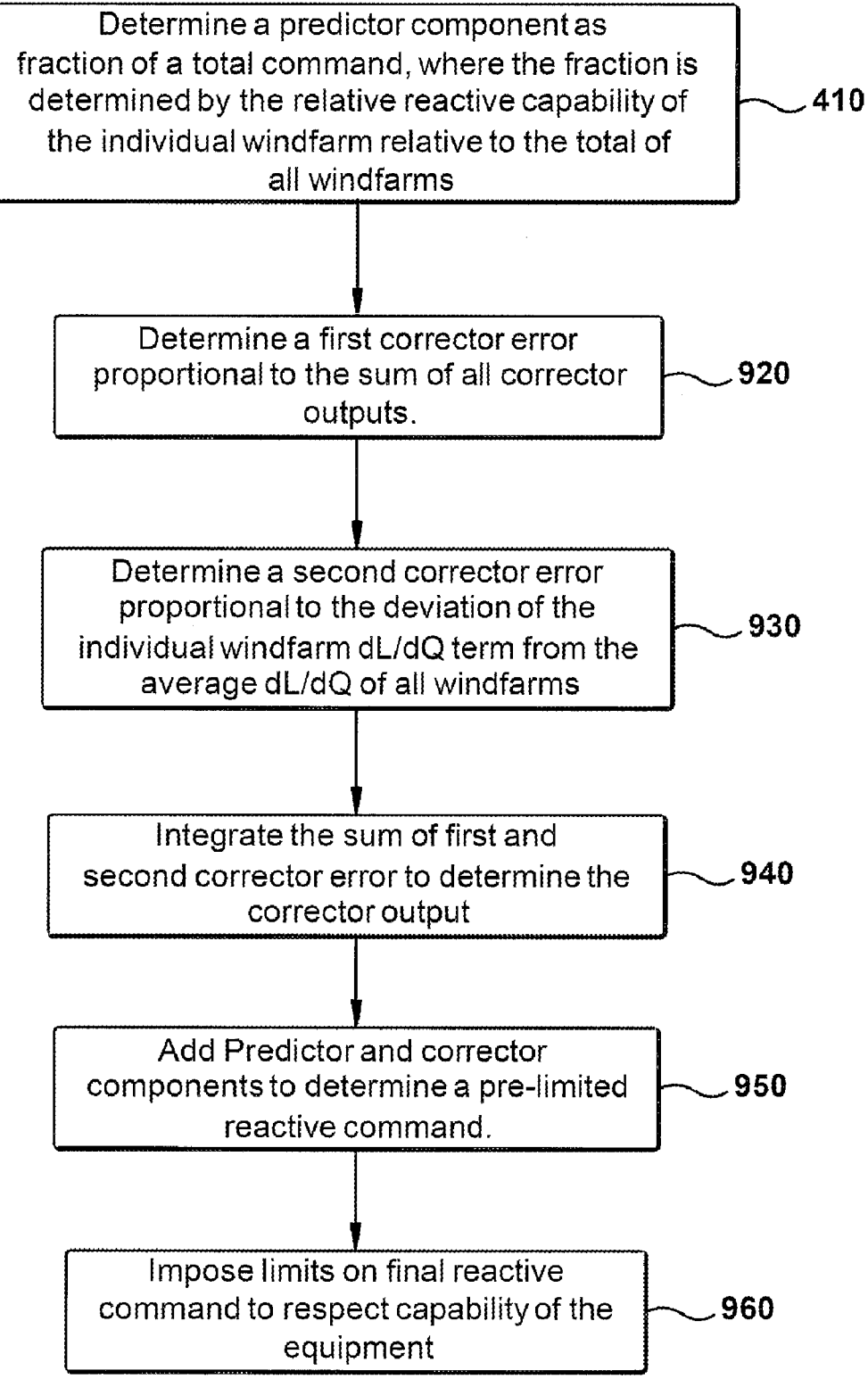
FIG. 9 illustrates a flow chart of a preferred embodiment for predictor-corrector approach to assigning reactive commands to the individual windfarms.

A preferred embodiment includes a predictor-corrector approach with the following steps, performed for each windfarm, as illustrated in FIG. 9. In step 910, a predictor component is determined as fraction of total command, where the fraction is determined by the relative reactive capability of the individual windfarm relative to the total of all windfarms. In step 920, determine a first corrector error proportional to the sum of all corrector outputs. The gain on this error is selected for rapid constraint of deviation from total reactive command, typically with settling time on the order of a few computation cycles of the corrector integration. In step 930, determine a second corrector error proportional to the deviation of the individual windfarm dL/dQ term from the average dL/dQ of all windfarms. The gain on this error is typically selected for a closed-loop response on the order of 10 to 30 seconds. The sum of first and second corrector error is integrated to determine the corrector output in step 940. Predictor and corrector components are added in step 950 to determine a pre-limited reactive command. In step 960, limits are imposed on final reactive command to respect capability of the equipment.

The objective in selecting V0Ref 847 is to minimize overall losses to the POI. This minimum occurs when an incremental change in V0Ref 847 will cause offsetting changes in loss between the windfarm total and the transmission network. This fact is appreciated by considering an example, where V0 846 is increased by 1%. If the transmission losses decrease by 100 kW and the windfarm losses increase by 100 kW, then there is no reason to change. However, if the transmission losses decrease by 200 kW then there is a net benefit in total losses and therefore motivation to increase the voltage.

It is therefore neccessary to determine the sensitivity of total losses to POCC voltage. The transmission portion is given directly by the term dL0/dV0 derived from the transmission system model. The windfarm portion requires consideration of the consequential effect of changing the total reactive command to achieve the POCC voltage change. This latter effect is conveyed in the term dV0/dQ0 derived from the transmission system model.

The contribution of each windfarm to total loss sensitivity is given by the Equation 3:

$$dLWFi/dV0 = dLi/dV0 + FQWFi*(dLi/dQi)/(dV0/dQ0) \quad \text{Equation 3,}$$

where dLWFi/dV0 represents a sensitivity of total windfarm loss for windfarm "i" due to changing V0; and FQWFi represents a fraction of reactive capability of windfarm "i" relative to total reactive capability of all windfarms.

The sensitivity of total system loss to POCC voltage is then given by Equation 4:

$$dLtotal/dV0 = dL0/dV0 + \text{sum}\{dLWFi/dV0\} \text{ for all windfarms} \quad \text{Equation 4.}$$

Figure 10:
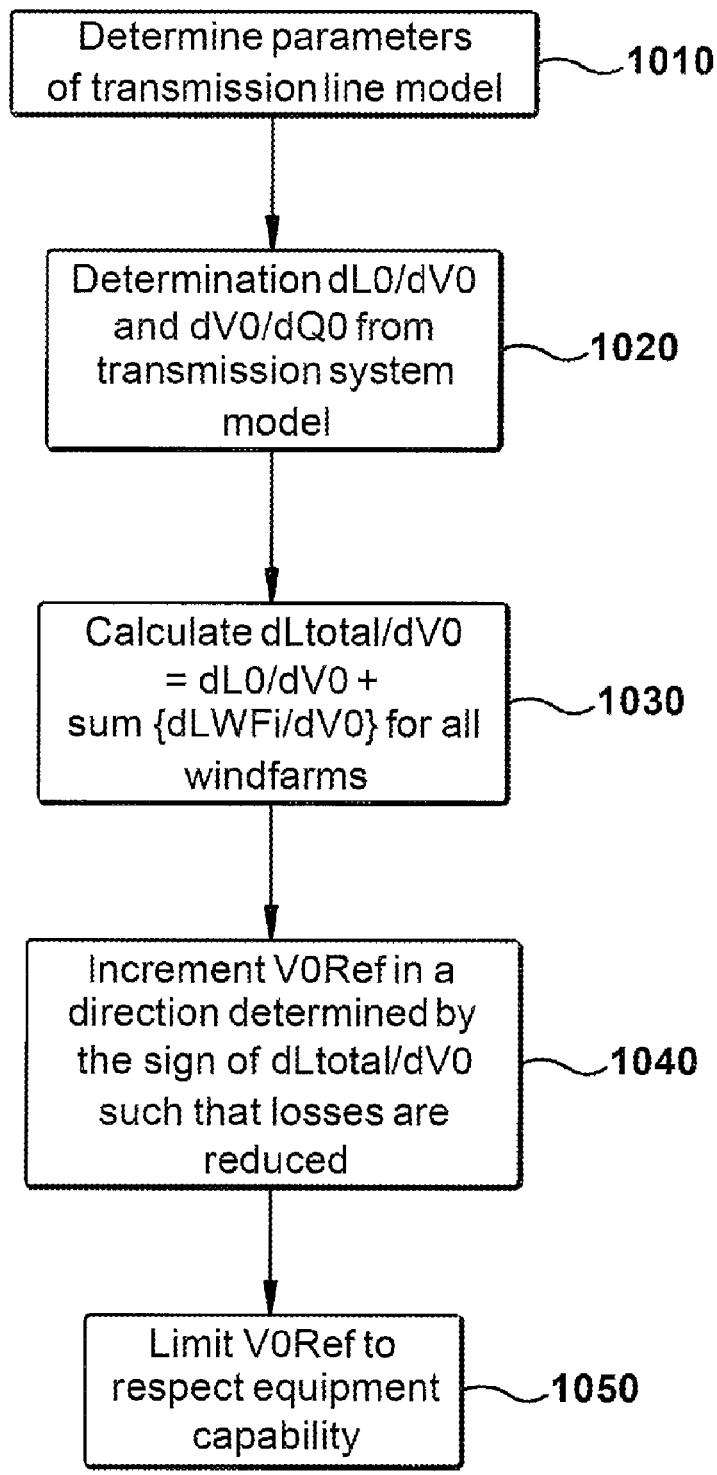
FIG. 10 illustrates a flow chart for establishing a voltage reference at a point of common coupling of a system of multiple windfarms with one or more transmission lines for the purpose of minimizing system losses.

FIG. 10 illustrates a flow chart for establishing a voltage reference (V0Ref) at a point of common coupling of a system of multiple windfarms with one or more transmission lines for the purpose of minimizing system losses up to the point of interconnection. Step 1010 determines parameters of transmission model. Step 1020 determines dL0/dV0 and dV0/dQ0 from transmission system model. Step 1030 determine dLtotal/dV0 according to: dLtotal/dV0=dL0/dV0+sum{dLWFi/dV0} for all windfarms. In step 1040 Increment V0Ref is incremented in a direction determined by the sign of dLtotal/dV0 such that losses are reduced. Further, in step 1050, V0Ref is limited with respect to equipment capability.

The rate of incrementing V0Ref 847 should be slow relative to the POCC voltage regulator closed-loop response. Typically ramping V0Ref 847 on the order of 1% per minute should give satisfactory results. Additional refinements, such as incorporation of deadband and hysteresis, would be within the capability of those with ordinary skill in the art.

An example of loss minimization is provided for a simulation of a windfarm system with two windfarms, wherein windfarm 1 has a reactive control range of +/−10 MVAR and windfarm 2 has a reactive control range of +/−20 MVAR. However, the optimization scheme is not limited to any specific number of windfarms.

Figure 11:
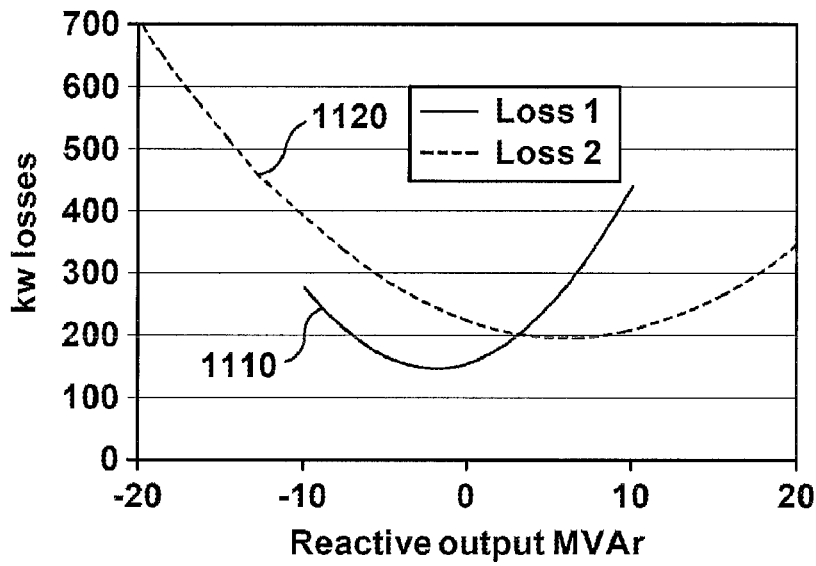
FIG. 11 illustrates windfarm loss characteristics for individual windfarms versus reactive output.
Figure 12:
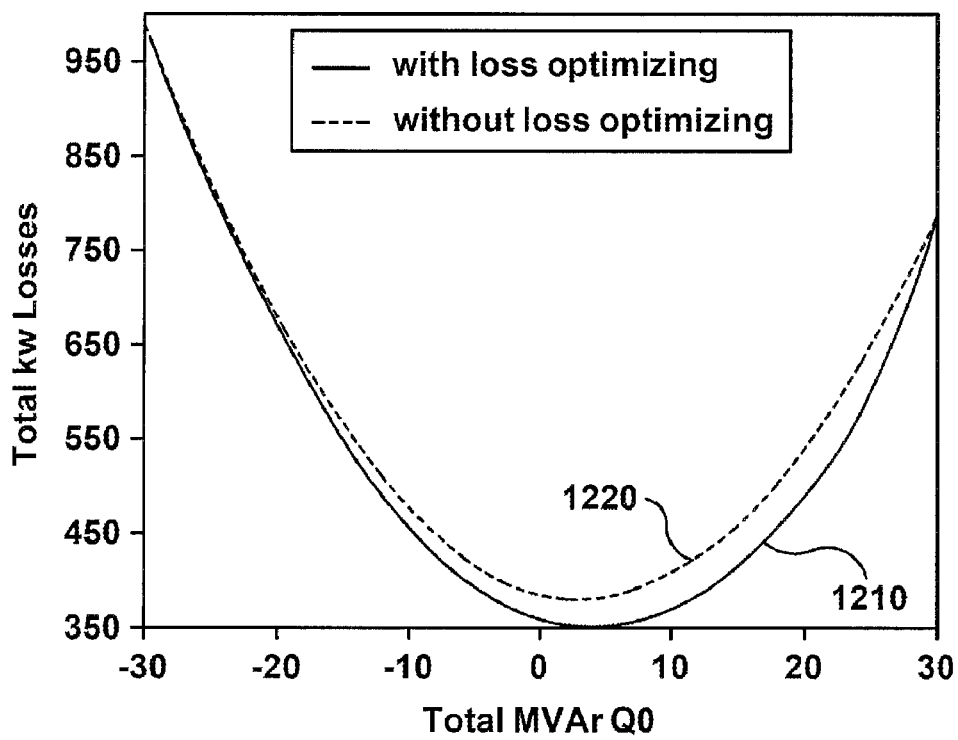
FIG. 12 illustrates a loss curve for combined losses of both windfarms using a loss optimization function and a loss curve for combined loss for both windfarms without the loss optimization function.

Windfarm loss characteristics for individual windfarms versus reactive output are shown in FIG. 11, with a loss curve 1 1110 for windfarm 1 and loss curve 2 1120 for windfarm 2. FIG. 12 illustrates a loss curve 1210 for combined losses for both windwarms using a loss optimization function as described above and a loss curve 1220 for combined loss for both windfarms without the loss optimization function (where the reactive commands are distributed solely based on relative rating without optimization). There is considerable benefit on the overexcited end (total MVAr Q0>0) of the range for this example, where loss curve 1210 is less than loss curve 1220.

Figure 13:
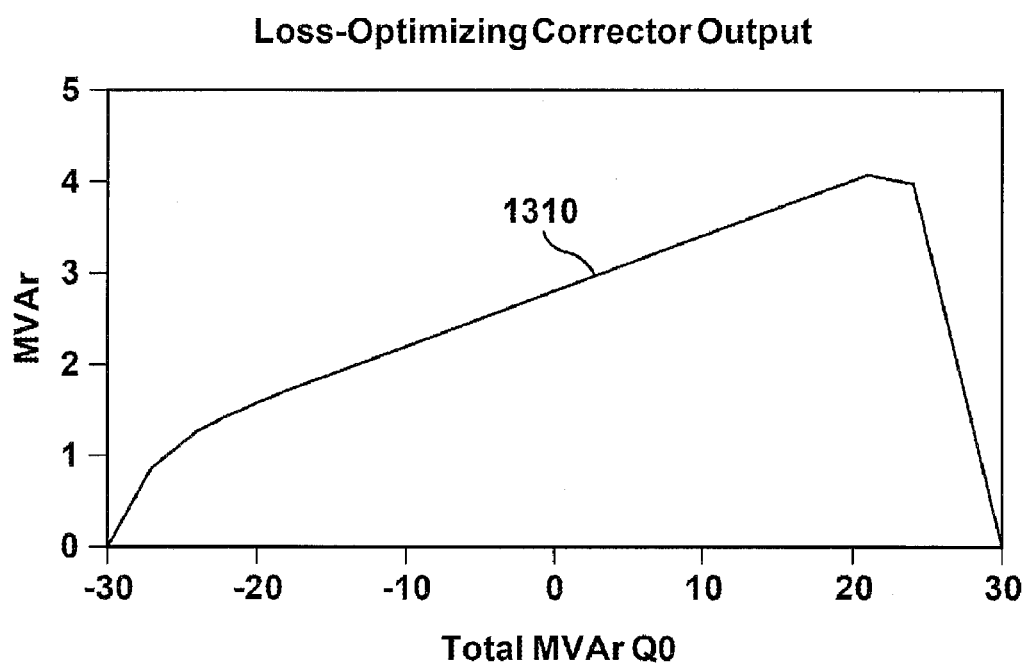
FIG. 13 illustrates the loss-optimizing corrector output to achieve the loss minimization represented in FIG. 12.

FIG. 13 shows the loss-optimizing corrector output 1310 to achieve the loss minimization shown in loss curve 1210 of FIG. 12. Observe that the loss-optimizing output is limited to zero at the extreme ends of the curve to respect the reactive limits of the two windfarms.

While various embodiments are described herein, it will be appreciated from the specification that various combinations of elements, variations or improvements therein may be made, and are within the scope of the invention.

What is claimed is:

1. A method for optimizing system loss for a system of multiple individual local windfarms including transmission lines, comprising:
    distributing a total reactive command for the system of multiple individual windfarms according to a loss optimization algorithm for the overall system; and
    distributing reactive commands assigned to individual windfarms to individual wind turbines according to a loss optimization algorithm for each individual windfarm.

2. The method of claim 1, further comprising assigning the reactive commands to individual windfarms so that a sum of the reactive commands equals the total reactive command and a partial derivative of losses with respect to reactive output is equal in steady-state for each individual windfarm.

3. The method of claim 2, wherein assigning the reactive commands to individual windfarms so that a sum of the reactive loads equals the total reactive load and a partial derivative of losses with respect to reactive output is equal in steady-state for each individual windfarm comprises assigning the reactive commands to individual windfarms using a predictor-corrector approach.

4. The method of claim 1, wherein a transmission line is located between a point of common coupling of the individual windfarms and a point of interconnection with a grid.

5. The method of claim 4, wherein distributing a total reactive command for the system of multiple individual windfarms according to a loss optimization algorithm for the overall system comprises establishing a reference voltage $V0ref$ at the point of common coupling in order to minimize losses at the point of interconnection.

6. The method of claim 5, wherein establishing a reference voltage $V0ref$ at the point of common coupling in order to minimize losses at the point of interconnection comprises:
    determining parameters for a transmission line model;
    determining $dL0/dV0$ based on the transmission line model; and,
    determining $dLtotal/dV0$ according to an equation:

$$dLtotal/dV0 = dL0/dV0 + sum(dLWFi/dV0),$$

where $dLWFi/dV0$ represents a sensitivity of total windfarm loss for windfarm "i" due to changing $V0$.

7. The method of claim 6, further comprising:
    determining $dV0/dQ0$ based on the transmission model; and,
    determining $dLWFi/dV0$ according to an equation:

$$dLWFi/dV0 = dLi/dV0 + FQWFi*(dLi/dQi)/(dV0/dQ0),$$

wherein $FQWFi$ represents a fraction of reactive capability of windfarm "i" relative to total reactive capability of all the individual windfarms.

* * * * *